United States Patent
Stavaeus et al.

(10) Patent No.: US 7,746,037 B2
(45) Date of Patent: Jun. 29, 2010

(54) POWER SUPPLY FOR AN ELECTRIC WINDOW DIMMING DEVICE

(75) Inventors: Mikael Stavaeus, Johanneshov (SE); Bodo Wisch, Bremen (DE); Wolfgang Suess, Bremen (DE); Lars Rowold, Varel (DE)

(73) Assignee: Airbus Deutschland GmbH (DE)

( * ) Notice: Subject to any disclaimer, the term of this patent is extended or adjusted under 35 U.S.C. 154(b) by 594 days.

(21) Appl. No.: 11/656,879

(22) Filed: Jan. 23, 2007

(65) Prior Publication Data
US 2008/0144158 A1 Jun. 19, 2008

Related U.S. Application Data

(60) Provisional application No. 60/763,280, filed on Jan. 30, 2006.

(30) Foreign Application Priority Data
Jan. 30, 2006 (DE) .................... 10 2006 004 224

(51) Int. Cl.
*H02J 7/00* (2006.01)
*G02B 26/02* (2006.01)
*B64C 1/14* (2006.01)

(52) U.S. Cl. .................... 320/166; 359/227; 244/129.3

(58) Field of Classification Search ................. 320/123, 320/166, 167; 359/227; 244/129.3
See application file for complete search history.

(56) References Cited

U.S. PATENT DOCUMENTS

| 5,111,629 | A | 5/1992 | Baughman et al. |
| 5,603,371 | A | 2/1997 | Gregg |
| 6,165,814 | A * | 12/2000 | Wark et al. .................. 438/108 |
| 2004/0262453 | A1 | 12/2004 | Sanz et al. |
| 2005/0200934 | A1* | 9/2005 | Callahan et al. ............. 359/265 |
| 2005/0200937 | A1* | 9/2005 | Weidner ..................... 359/275 |

FOREIGN PATENT DOCUMENTS

WO WO-94/11778 5/1994

* cited by examiner

*Primary Examiner*—Edward Tso
*Assistant Examiner*—M'Baye Diao
(74) *Attorney, Agent, or Firm*—Lerner, David, Littenberg, Krumholz & Mentlik, LLP

(57) ABSTRACT

An electric window dimming device for reducing the light transmission of a window for an aircraft. The electric window dimming device comprises a capacitance. The electric window dimming device is adapted for being connected to the capacitance and to a primary energy source that provides energy. If the primary energy source fails, the capacitance supplies energy for electric window dimming device.

14 Claims, 1 Drawing Sheet

POWER SUPPLY FOR AN ELECTRIC WINDOW DIMMING DEVICE

CROSS-REFERENCE TO RELATED APPLICATIONS

This application claims the benefit of the filing date of U.S. Provisional Patent Application No. 60/763,280 filed Jan. 30, 2006, the disclosure of which is hereby incorporated herein by reference.

BACKGROUND OF THE INVENTION

The present invention relates to an electric window dimming device, a window unit, a method for controlling an electric window dimming device, an aircraft as well as the utilization of the electric window dimming device in an aircraft.

Modern window technology may make it possible to equip aircraft windows in today's commercial aircraft with electrically operated window shades. This free adjustability by an electric window shade makes it possible for the passengers to adjust the light transmission of an aircraft window in accordance with personal preferences. Possible dimming devices for windows are, for example, electrically or electromechanically operated awnings or covering devices that may enable the passengers to cover a certain region of an aircraft window.

Modern window technology furthermore may make it possible to adjust the light transmission over the entire window pane by electrically obscurable window films or coatings. These window films may be based on LCD-technologies, electrochromic films, LC-films (liquid crystal) or SPD-films (suspended-particle devices). In this case, the passengers may be able to individually adjust the respectively desired light transmission of a window pane similar to the effect of sunglasses.

Electric dimming devices may be operated with electric energy obtained from the on-board network. However, certain safety guidelines in the aircraft industry may stipulate that it must also be possible to set or adjust the electric dimming devices to a transparent state in case of a power failure of the on-board network. Transparency may be ensured, in particular, for door windows or windows near doors, for example, in order to make it possible to identify a fire in front of the door.

Consequently, it may have to be possible to set electromechanical dimming devices to the transparent state or to adjust obscurable coating or film technologies to the transparent state in case a power failure occurs. In this respect, the utilization of obscurable film technology, particularly the SPD-technology, may be problematic because the devices may be set to the opaque state in case of a power failure. SPD-films therefore may require some energy in order to remain in the transparent state.

This is usually realized with batteries that are intended to ensure that the electric dimming devices may still be operated in case of a power failure. Consequently, it is important to constantly check the batteries with respect to their operability and, if so required, to replace the batteries.

SUMMARY OF THE INVENTION

Among other thinks, it may be an object of the present invention to ensure the power supply of an electric window dimming device.

According to one exemplary embodiment of the present invention, an electric window dimming device for reducing the light transmission of a window for an aircraft comprises a capacitance. The electric window dimming device may thereby be adapted for being connected to the capacitance and for being connected to a primary energy source.

The capacitance may be adapted for providing energy for the window dimming device in case of failure of the primary energy source.

According to another exemplary embodiment of the invention, a method for controlling an electric window dimming device is provided. The electric window dimming device is thereby connected to a primary energy source and to a capacitance. The capacitance may provide energy for the window dimming device in case of failure of the primary energy source.

According to another exemplary embodiment of the invention, a window unit for an aircraft is provided. In this case, the window unit comprises a window and an inventive electric window dimming device according to the preceding description. The electric window dimming device may be adapted for adjusting the light transmission of a window.

According to another exemplary embodiment of the invention, a window unit with the above-described characteristics may be utilized in an aircraft.

In another exemplary embodiment, an aircraft with a window unit according to the above-described characteristics may be provided.

In the context of the invention, the term "primary energy source" may refer to a power source that provides energy or power for a consumer in the normal operating mode. The term "network" or "network system" may refer to the supply network that supplies power for the window unit in the regular operating mode. A network designated as such in the present invention may also be able to transmit data to the window unit or receive data from this window unit in addition to supplying energy. In this respect, networks may consist, for example, of on-board supply systems of aircraft or other primary control or primary supply circuits in vehicles.

In the present invention, the term "capacitance" may refer to all types of capacitor components that are able to provide energy for a consumer. The described capacitances may be selected from the group consisting of capacitors, aluminum-electrolyte capacitors, tantalum-electrolyte capacitors, double-layer capacitors, cylindrical capacitors and spherical capacitors.

The term "electric window dimming devices" may refer to any window dimming devices or window shades that may be operated electrically or electromechanically. For example, electromechanical window shades are awnings or other covering devices that may be operated, for example, by electric servomotors. Electric window shades consist, for example, of films or coatings that may be applied to the window and may be able to vary the light transmission due to an applied energy. Examples in this respect may be obscuring films based on LCD-films (liquid crystal), electrochromic films or SPD-films (suspended-particle devices).

The electric window dimming device according to the invention may provide a reliable and maintenance-free power supply for electric window dimming devices. Safety regulations may stipulate that it may have to be possible to control electric window dimming devices in case of failure of the primary energy source in order to ensure the transparency of the windows. During emergency landings, in particular, it may have to be possible to detect a fire behind a door in order to safely rescue passengers. The accumulators or batteries used until now for realizing the emergency power supply may have a high weight, may require intensive maintenance and may only supply little power. The state of the batteries may need to be constantly checked because the batteries may need to be replaced even if they are not used due to self-discharge. The use of capacitances in accordance with the present invention may provide a lightweight and maintenance-free emergency power supply system that may set the electric window dimming device to a state in which optical light waves may be transmitted if the power supply of the on-board network is interrupted.

Due to their small size, capacitances may provide improved installation options in comparison with accumulators or batteries. Capacitors may be very reliable and therefore suitable for use in important systems. Since capacitors may have a slight self-discharge, they may be quite suitable for use as a stand-by voltage source, for example, for consumers that only operate for a short period of time. Consequently, capacitors may also be used for window dimming devices in order to intercept an interruption in the power supply of the on-board network. Weight advantages may be attained in comparison, for example, with so-called accumulator-operated EPSUs (Emergency Power Supply Units) due to the low own weight of the capacitors or storage capacitors, namely even in a local installation near the consumer. The low own weight of capacitors may make it possible to achieve an additional weight reduction in the construction of aircraft.

According to another exemplary embodiment of the present invention, the electric window dimming device comprises a control unit with a first interface and a second interface. In this case, the control unit may be adapted for being connected to the primary energy source by the first interface and being connected to the capacitance by the second interface. The control unit is adapted for controlling the electric window dimming device in this case. The utilization of a control unit for an electric window dimming device may enable the passengers to individually adjust the transparency of a window. The control unit may be operated in a decentralized fashion by each passenger or in a centralized fashion, for example, by the flight crew. Consequently, a member of the flight crew may be able to deactivate the dimming devices in a centralized fashion by actuating a button in case panic breaks out on board the aircraft.

According to another exemplary embodiment of the present invention, the capacitance comprises a third interface, wherein the capacitance is adapted for being connected to the primary energy source by the third interface. The connection of the capacitance with the primary energy source may make it possible, for example, to measure the energy supply status. This not only may make it possible to compensate a fluctuation in the power supply, but may also to detect an interruption in the power supply of the primary energy source. Consequently, the capacitance may also be used, for example, as an energy buffer for compensating power fluctuations.

According to another exemplary embodiment of the present invention, the capacitance is adapted for being charged with the primary energy source. In this case, it may be ensured that the capacitance is able to make available sufficient power in case the energy supply of the primary energy source fails. In contrast to batteries or accumulators, the capacitance may be recharged as many times as necessary without a decrease in performance. The capacitance therefore may require much less maintenance and usually does not have to be serviced.

According to another exemplary embodiment of the present invention, the electric window dimming device comprises a drive unit. In this case, the drive unit of the window dimming device is adapted such that the drive unit can be controlled by the control unit. Drive units of electromechanical window shading devices may consist, for example, of servomotors, wherein drive units of electric window dimming devices such as, for example, SPD-films may consist of voltage generators.

According to another exemplary embodiment of the present invention, the electric window dimming unit has a first state and a second state. The first state allows the transmission of optical light waves while the second state reduces the transmission of optical light waves. The electric window dimming device may be switched over from the first state into the second state or vice versa in an abrupt fashion or switched over from the first state into the second state or vice versa with a linear transition. In case of a gradual transition from the first state, in which optical light waves may be transmitted, into the second state, in which the transmission of optical light waves may be reduced, it may be possible, for example, for the passenger to adjust an individual light transmission such that the comfort may be improved.

According to another exemplary embodiment of the present invention, the control unit is adapted for setting the window dimming device in case of failure of the primary energy source to the first state, in which optical light waves are transmitted. It may be impossible to manually operate the control unit so as to deactivate the window dimming device in case of an emergency, in which panic frequently breaks out. Consequently, the control unit according to this embodiment may be able to automatically or independently set the window dimming device to the first state or to the second state, in which the window dimming device allows the transmission of optical light waves, if the power supply of the primary supply system is interrupted.

The exemplary embodiments of the electric window dimming device also relate to the window unit, the method, the use of the electric window dimming device as well as the aircraft with an electric window dimming device and vice versa.

According to another exemplary embodiment of the method, the capacitance is connected to the primary energy source by a third interface.

According to another exemplary embodiment of the method, the capacitance is charged with the primary energy source.

According to another exemplary embodiment of the method, the dimming unit is set to a state, in which optical light waves may be transmitted, in case of failure of the primary energy source. This may ensure the transparency of the aircraft window or the transmission of light waves through the aircraft window in hazardous situations. Screening of the windows or dimming of the passenger compartment by the window dimming device therefore may be prevented in case of a power failure.

The safety on board of an aircraft may be improved by supplying the control unit or the dimming device with energy by the capacitance in case of failure of the primary energy source. In comparison with conventional batteries, accumulators or other chargeable energy sources, the capacitance may have a low weight and small assembly dimensions. In addition, batteries or accumulators may need to be occasionally replaced because they self-discharge over time. The performance of batteries or accumulators may also decreases if they are frequently charged. Due to their design, capacitances may have a low self-discharge and consequently may hold the stored energy for a sufficiently long time. In addition, capacitances may practically be charged as many times as necessary without suffering a decrease in performance. This means that capacitances may not have to be replaced as frequently such that the costs may be reduced and the maintenance expenditure may be lowered.

BRIEF DESCRIPTION OF THE DRAWINGS

In order to further elucidate and better understand the invention, embodiments are described in greater detail below with reference to the enclosed drawings. In these drawings.

DETAILED DESCRIPTION

Figure 1:
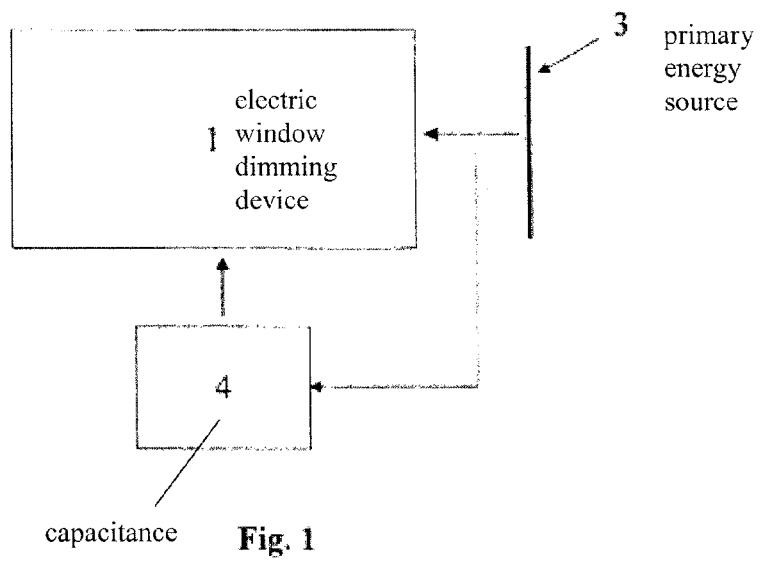
FIG. 1 shows a schematic block diagram of the electric window dimming device according to one exemplary embodiment of the invention.

Identical or similar components are identified by the same reference characters in the figures. The illustrations in the figures are diagrammatic and not to scale.

FIG. 1 shows an exemplary embodiment of the present invention. The electric window dimming device 1 for reducing the light transmission of a window comprises a capacitance 4. The electric window dimming device 1 is connected to the capacitance 4 and to a primary energy source 3 that provides energy. In case of failure of the primary energy source 3, the capacitance 4 supplies energy for the window dimming device 1. Consequently, the dimming devices can still be operated in an emergency.

Figure 2:
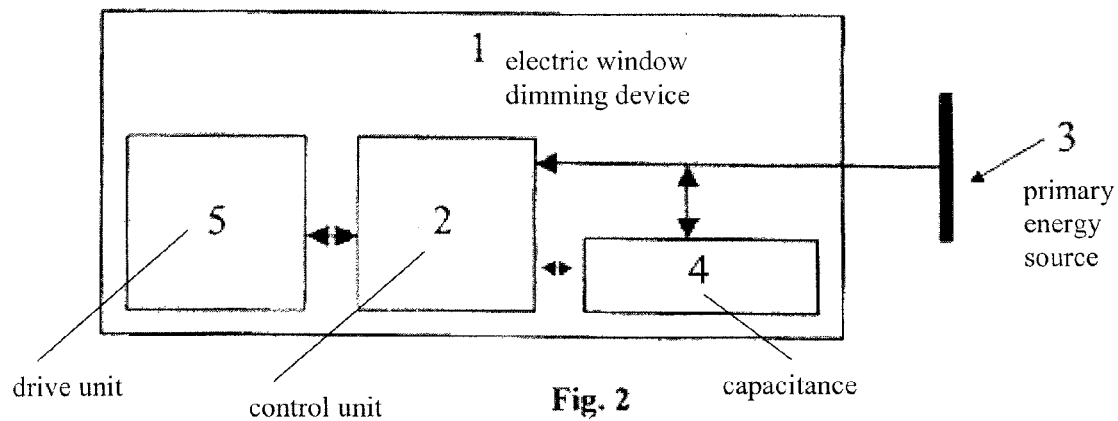
FIG. 2 shows a schematic block diagram of another exemplary embodiment of the electric window dimming device according to one exemplary embodiment of the invention.

FIG. 2 shows another exemplary embodiment of the electric window dimming device 1 according to the invention. The electric window dimming device 1 for reducing the light transmission of a window comprises a capacitance 4 and a control unit 2 with a first and a second interface. In this case, the window dimming device 1 is adapted for being controlled by the control unit 2. The control unit 2 is connected to a primary energy source 3 adapted for providing energy by the first interface. The control unit 2 is connected to the capacitance 4 by the second interface. If the primary energy source 3 fails or the primary energy source 3 no longer supplies energy to the control unit 2, the control unit 2 may still be supplied with energy by the capacitance 4.

Consequently, a window dimming device 1 may also be supplied with energy in hazardous situations in order to set the aircraft windows to a state in which they allow the transmission of optical light waves. A transparency of the aircraft windows may therefore be ensured such that no undesirable dimming occurs in emergencies due to the activated dimming device 1. The transparency of the windows may be important in case of conflagration in order to detect a fire behind a door.

FIG. 2 also shows that the capacitance 4 may additionally feature a third interface for connecting the capacitance 4 to the primary energy source 3. In the normal operating mode, the capacitance 4 may be charged with the primary energy source 3. Consequently, the capacitance 4 may be able to supply power if the energy supply of the primary energy source 3 is interrupted. The capacitance 4 may furthermore serve as an energy buffer. Power fluctuations of the primary energy source 3 may be measured, for example, by the capacitance 4 or the control unit 2 and compensated with the aid of the capacitance 4.

FIG. 2 also shows a drive unit 5 for actuating the window dimming unit 1. This drive unit 5 may consist, for example, of servomotors that operate, for example, an awning or other electromechanical shading devices 1.

Modern window technologies may make it possible to dim a window unit similar to the effect of sunglasses by regulating the transmission of optical light waves through the windows step-by-step or in a linear fashion, namely with certain crystal structures that are excited with actuators or by energy. The control unit 2 may be able to control these actuators 5.

The control unit 2 may also be automated. For example, the control unit 2 may independently and automatically control the window dimming unit 1 in such a way that the windows are set to a state in which optical light waves may be transmitted if the energy supply of the primary energy source 3 is interrupted. This means that the control unit 2 may still be activated in case of an emergency, in which it may not be possible to manually operate said control unit. The control unit 2 may independently and automatically deactivate the dimming device 1 in order to set the windows to a transparent state.

In addition, it should be noted that "comprising" does not exclude any other elements or steps and that "a" or "an" does not exclude a plurality. It should furthermore be noted that characteristics or steps that were described with reference to one of the preceding embodiments can also be used in combination with other characteristics or steps of other above-described embodiments. The reference characters in the claims should not be understood in a restrictive sense.

The invention claimed is:

1. An electric window dimming device for reducing the transparency of a window for an aircraft, the electric window dimming device comprising:
   a capacitance; and
   a control unit;
   wherein the electric window dimming device is adapted for being connected to the capacitance;
   wherein the electric window dimming device is adapted for being connected to a primary energy source;
   wherein the capacitance is adapted for providing energy for the window dimming device in case of failure of the primary energy source;
   wherein the electric window device has a first state and a second state;
   wherein the first state provides the transmission of optical light waves;
   wherein the second state reduces the transmission of optical light waves;
   wherein the control unit is adapted for setting the electric window dimming device to the first state in case of failure of the primary energy source in order to transmit optical light waves.

2. The electric window dimming device of claim 1,
   wherein the control unit comprises a first interface and a second interface;
   wherein the control unit is adapted for being connected to the primary energy source by the first interface;
   wherein the control unit is adapted for being connected to the capacitance by the second interface; and
   wherein the control unit is adapted for controlling the electric window dimming device.

3. The electric window dimming device of claim 1, wherein the capacitance comprises a third interface;
   wherein the capacitance is adapted for being connected to the primary energy source by the third interface.

4. The electric window dimming device of claim 3, wherein the capacitance is adapted for being charged by the primary energy source.

5. The electric window dimming device of claim 2, further comprising a drive unit for actuating the electric window dimming device,
   wherein the drive unit is adapted for being controlled by the control unit.

6. The electric window dimming device of claim 1, wherein the primary energy source is selected from the group consisting of networks, onboard networks, generators and power supply systems.

7. The electric window dimming device of claim 1, wherein the capacitance is a capacitor.

8. A window unit for an aircraft, the window unit comprising:
   a window; and
   an electric window dimming device for reducing the transparency of a window for an aircraft, the electric window dimming device comprising:
   a capacitance; and
   a control unit;
   wherein the electric window dimming device is adapted for being connected to the capacitance;
   wherein the electric window dimming device is adapted for being connected to a primary energy source;
   wherein the capacitance is adapted for providing energy for the window dimming device in case of failure of the primary energy source;
   wherein the electric window dimming device has a first state and a second state;
   wherein the first state provides the transmission of optical light waves;
   wherein the second state reduces the transmission of optical waves;
   wherein the control unit is adapted for setting the electric window dimming device to the first state in case of failure of the primary energy source in order to transmit optical light waves;
   wherein the electric window dimming device is adapted for regulating the light transmission of a window.

9. A method for controlling an electric window dimming device, comprising:
   connecting the electric window dimming device to a primary energy source; and
   connecting the electric window dimming device to a capacitance;
   wherein the electric window dimming device has a first state and a second state;
   wherein the first state provides the transmission of optical light waves;
   wherein the second state reduces the transmission of optical waves;
   wherein the capacitance provides energy for the window dimming device in case of failure of the primary energy source in order to set the electric window dimming device to a first state in which optical light waves are transmitted.

10. The method of claim 9, further comprising:
    connecting a control unit to the primary energy source by a first interface; and
    connecting the control unit to the capacitance by a second interface;
    controlling the electric window dimming device by the control unit.

11. The method of claim 9, further comprising:
    connecting the capacitance to the primary energy source by a third interface.

12. The method of claim 11, further comprising:
    charging the capacitance with the primary energy source.

13. The method of claim 9, further comprising:
    adjusting a state of the dimming device that allows the transmission of optical light waves in case of failure of the primary energy source.

14. An aircraft with an electric window dimming device for reducing the light transmission of a window, the electric window dimming device comprising:
    a capacitance;
    a control unit;
    wherein the electric window dimming device is adapted for being connected to the capacitance;
    wherein the electric window dimming device is adapted for being connected to a primary energy source;
    wherein the capacitance is adapted for providing energy for the window dimming device in case of failure of the primary energy source;
    wherein the electric window dimming device has a first state and a second state;
    wherein the first state provides the transmission of optical light waves;
    wherein the second state reduces the transmission of optical light waves;
    wherein the control unit is adapted for setting the electric window dimming device to the first state in case of failure of the primary energy source in order to transmit optical light waves.

* * * * *